Sept. 5, 1950 P. F. MORGAN 2,521,474
AERATION UNIT AND SUPPORT THEREFOR
Filed Aug. 17, 1945
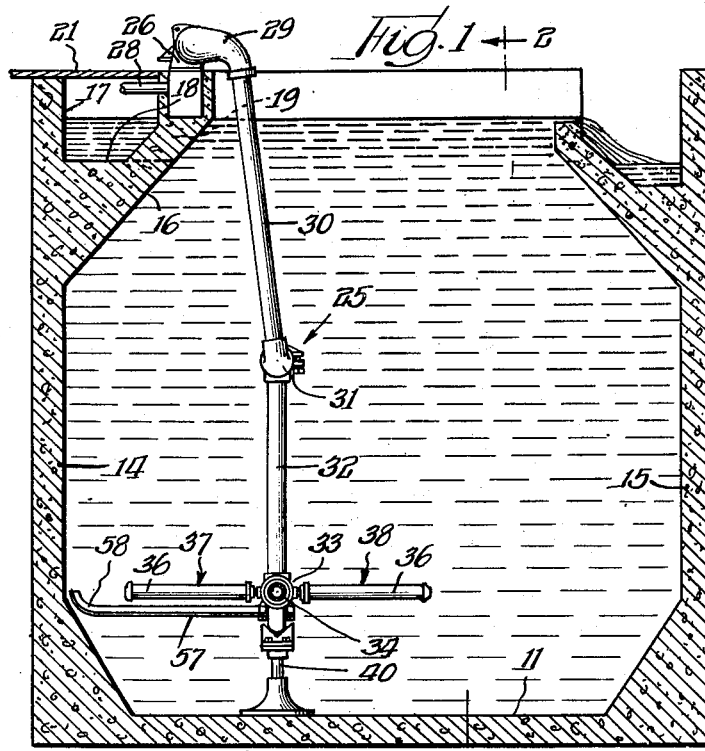
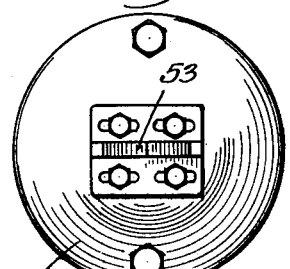
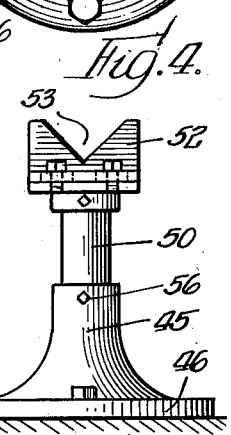
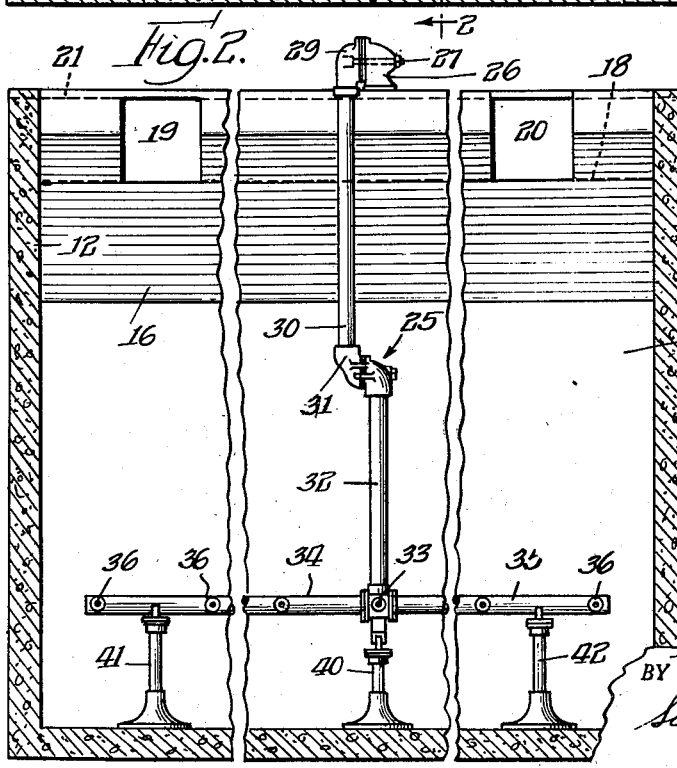
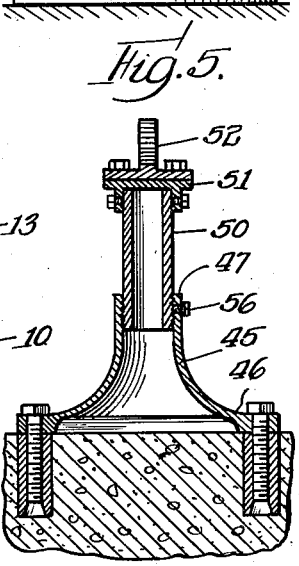
INVENTOR.
Philip F. Morgan
BY
Schneider & Dressler
attys.

Patented Sept. 5, 1950

2,521,474

UNITED STATES PATENT OFFICE 2,521,474

AERATION UNIT AND SUPPORT THEREFOR

Philip F. Morgan, Elmhurst, Ill., assignor to Chicago Pump Company, a corporation of Delaware Application August 17, 1945, Serial No. 610,934

2 Claims. (Cl. 261—124)

This invention relates to liquid aeration systems and particularly to those systems having aeration tanks provided with articulated diffuser units. More particularly, the invention relates to sewage systems employing that type of articulated diffuser unit having joints normally disposed under operating conditions below the liquid level of sewage in aeration tanks and/or in channels leading to the tank.

A complete diffuser unit of the above type generally comprises a hollow anchoring structure or stanchion to which may be pivotally mounted the diffuser unit proper. The diffuser unit proper may be as disclosed in Patent 2,328,655 to Lannert. Thus it may consist of two or more pipe lengths jointedly connected to jack-knife in the up position of the unit. In the down position of the unit, which is the normal operating position, the pipe lengths are generally extended and, at the end of the pipe system, there is a diffuser assembly. Each such assembly has one or more manifolds from which extend diffuser elements generally transversely therefrom; the diffuser elements being as long and as numerous as conditions require.

While the entire pipe system and manifolds are customarily made of mechanically strong material, such as iron or steel, the air diffuser elements themselves are generally made of ceramic or similar material having substantially less mechanical strength than iron or steel. As is well known, such diffuser elements are generally provided with a large number of minute apertures through which air or other aeriform body is diffused into the liquid mass of sewage or other material being treated.

In the normal operation of an air diffuser system, particularly one used for treating sewage, the creation of well-defined sewage currents within the tank is desirable. As a rule, substantial turbulence is created and the sewage flow occurs at a substantial rate. Because of the existence of such turbulent conditions, it is found that considerable stresses are created over the entire diffuser unit.

It is clear from the general construction of a diffuser unit that the center of gravity of the entire system under normal operation is quite low. The greater the number of diffuser elements carried by the manifold, the lower is the center of gravity of the entire diffuser unit.

A diffuser unit having a low center of gravity and extending into a turbulent liquid will have substantial stresses and strains on the various portions of the unit. The elasticity of the metal pipes supporting the manifold and diffuser elements, together with the relatively large exposed surface of the manifolds and diffuser elements, results in movement of the entire diffuser unit. Such movement generates strains at the various joints of the entire diffuser system. In the prior art, the joint at the stanchion carrying the entire articulated diffuser unit has had great strains created therein. The low center of gravity of the entire diffuser unit and the existence of substantial forces at the bottom end thereof generally results in constant action at the joints, particularly at the stanchion joint, and in the ultimate loss of air at the joints. Due to this loss of air the efficiency of the entire unit is seriously impaired. In addition, the leakage of air at the strained joints may interfere with the creation and maintenance of well-defined liquid currents in the sewage tank and may deleteriously affect sewage treatment.

A further undesirable result of such whipping and stresses is the breakage of diffuser elements. In an attempt to avoid the above undesirable characteristics, it has been the general practice to have a comparatively small number of diffuser elements for each diffuser assembly to minimize the effects of the reactive and turbulent forces existing around the diffuser assembly. And the stiffness of the depending pipes has been relied upon to maintain the diffuser elements more or less rigidly in position.

It is clear that the cost of an installation for sewage treatment involves as an important element the number of diffuser units. By virtue of the invention herein, it is possible to provide fewer but larger diffuser units. The invention herein provides means for stabilizing a diffuser unit against whipping or strain incident to normal diffusion operation. The invention in general provides means for suppressing movement of manifolds during the normal operation of a diffuser assembly, thereby almost completely eliminating whipping. This permits the use of large diffuser assemblies and also provides greater flexibility with regard to the amount of turbulence that can be tolerated in a treating tank.

In accordance with the invention herein, the depending supply pipe under normal operating conditions merely serves to supply air and no longer has any primary mechanical functions of supporting and stiffening the diffuser assembly. It is thus possible to design the supply pipe with scant regard for the stresses that would normally have to be considered.

Referring to the drawings:

Figure 1 is a sectional elevation of an aeration tank system embodying the invention. Figure 2 is a vertical transverse section of the system of Figure 1, taken along the line 2—2 of Figure 1. Figure 3 is a plan view of a supporting element for the manifold. Figure 4 is a front elevation of the supporting element, and Figure 5 is a vertical section taken therethrough.

In the drawings, tank 10 of concrete or other suitable material has bottom 11, end walls 12 and 13 and side walls 14 and 15. One of the walls, here shown as side wall 14, has an overhanging ledge 16 in the general form of a half Y. Top portion 17 of wall 14 is channeled at 18, this being an influent sewage channel having end ports 19 and 20 giving access to the tank proper. Channel 18 is covered with plate 21 to form a catwalk along the tank. Disposed within the tank is shown an articulated air diffusing unit generally indicated by numeral 25. This unit, except for the length of header and number of diffuser elements, is generally described in the above patent to Lannert.

Diffuser unit 25 includes hollow stanchion 26 suitably anchored in the top of over-hanging ledge 16. This stanchion may be supplied with compressed air from pipe 28 extending along the upper portion of channel 18. Pivotally secured to stanchion 26 on a pivot pin 27, is fitting 29 in the general form of an elbow. This elbow is hollow and communicates with the interior of stanchion 26. Elbow 29 has a tapped end into which pipe 30 may be threaded. Pipe 30 may be of any suitable material such as iron or steel and, at the end, is threaded into pivot joint 31. Both elbow fitting 29 and pivot joint 31 are so disposed that pivotal movement in vertical planes normal to tank wall 14 is provided. Joint 31 may have the relatively movable portions provided with bosses and a stop bolt to limit joint movement, as in the Lannert patent.

Pivot joint 31 carries pipe section 32 provided with fitting 33 at the end thereof. Fitting 33 may resemble the conventional T fitting and carries manifolds 34 and 35 at opposite sides thereof. As is clearly evident from Figure 2, manifolds 34 and 35 normally extend transversely from the end of pipe 32 and are generally disposed parallel to the tank bottom and side 14. Manifolds 34 and 35 carry a number of diffuser elements 36 threaded in or otherwise secured thereto. The diffuser elements may be of ceramic or iron or any other desired material provided with a number of minute apertures through the wall through which air may diffuse. The diffuser elements preferably extend transversely of manifolds 34 and 35 and parallel to the tank bottom. One series 37 of diffuser elements may extend toward tank wall 14, while the remaining series 38 may extend away from tank wall 14.

In order to anchor the diffuser assembly under normal operating conditions, supporting standards are provided at spaced intervals. Standards 40, 41 and 42 may be disposed, respectively, at fitting 33 and near the ends of manifolds 34 and 35. Additional standards may be provided, as desired.

Inasmuch as these standards all have the same construction, only one will be described in detail. Each standard comprises a vertical hollow pedestal 45 having a flaring base 46 bolted or permanently anchored to the tank bottom. Pedestal 45 may be of any suitable material, preferably iron or steel, and has a cylindrical top 47 threaded on the inside thereof.

Threaded into top 47 of the pedestal is post 50 to which may be bolted cap 51. Cap 51 carries saddle 52 rigidly mounted thereon, this being in the form of an upwardly extending block having a V-shaped cut-out 53 formed therein. Cut-out 53 is sufficiently large so that fitting 33 or manifolds 34 and 35 can comfortably and snugly rest therein. As is clearly evident from Figures 1 and 2, the saddles are alined so that the V notches extend along a line parallel to the tank side 14. Bolt 56 may be provided to maintain a standard in predetermined adjusted position. The supporting height for the standard may be determined by rotating post 50 with respect to pedestal 45.

It is preferred to adjust the effective supporting height of the standards so that top pipe section 30 will be inclined from the vertical. This angular disposition of the two pipes results in several advantages. Thus, pipe 30 is supported between elbow 29 and joint 31. This is desirable since no great dead weight is impressed on elbow 29. In addition, pipes 30 and 32 are not tensioned and do not form a rigid system. It is manifest that the diffuser assembly consisting of the manifolds and diffuser elements is permitted to adjust itself to the standards and is not constrained in any way by the supply pipe system. This is particularly desirable in that no great stresses are impressed upon pivot joint 31. While temporary strains may be impressed upon this pivot joint during raising or lowering of the entire unit, such strains are quickly relieved. In the absence of the standards, strains on the pivot joints have tended to damage them. A further desirable advantage of the relaxed condition of the pivot joint is that there is no opportunity for grit to work into the machined joint surfaces and gradually destroy them.

One or more stops 57 may be carried by fitting 33 and manifolds 34 and 35 to prevent the diffuser elements from striking wall 14. Stop 57, as is evident from Figure 1, extends from fitting 33 or the manifolds, as the case may be, beyond diffuser elements 36 toward wall 14 in the normal operating position. This stop may be of pipe or solid rod and is preferably provided with an upwardly curved tip 58.

The entire diffuser unit may be raised out from or lowered into the tank by exerting suitable force upon elbow 29, as by a cable engaging the crook of the elbow. It is preferred to have pipe 32 somewhat shorter than pipe 30 so that, when the unit is raised above the tank, the diffuser assembly will clear the top of the tank. This is clearly shown in Figure 1 of the Lannert patent previously mentioned. In lowering the unit into the tank, the diffuser assembly will tend to swing toward wall 14. This is evident from the proportions, mounting and disposition of the component parts of each diffuser unit. It is preferred to proportion stop 57 so that, when the entire unit is short of its final operating position, it will just barely touch the wall and permit the bottom of fitting 33 and manifolds 34 and 35 to engage V-slot 53 of each standard at the side nearest wall 14. Thereafter, slot 53 takes over the guiding action of the manifold assembly and moves the manifold and diffuser elements away from wall 14. Thus, stop 57 will clear wall 14 and permit the diffuser assembly to be cradled in the standards in the operating position of the diffuser unit.

It is evident from the above that manifolds 34 and 35 may be as long as desired and may have as many diffuser elements extending therefrom as may be deemed necessary. If desired, auxiliary means acting on the manifolds may be provided for aiding in raising or lowering the same so that pipes 30 and 32 will not bear the entire weight of manifolds and diffuser elements during such operations. A substantial portion of the weight of the entire diffuser unit may be neutralized by keeping air at a low pressure in the unit during the raising or lowering. Thus, by having just enough air pressure to prevent any liquid from entering any part of the diffuser unit, but not enough to create any substantial turbulence, it is possible to take advantage of the buoyancy of the contained air in supporting the weight of the manifolds and diffuser elements during the raising or lowering thereof.

While the diffuser unit has been described with particular reference to its use in a sewage treating tank, it is not limited to such use, for it may be used in tanks for aerating or gasifying any desired liquid. In the latter use any suitable gas or gasiform may be used in lieu of air. Because of the supporting means of the present invention, the diffuser assembly may be made larger than heretofore, thereby making commercially feasible the use of air diffusion units in long channels, such as in the channel between the primary settling tank and the aeration tank in a sewage treating system.

I claim:

1. In an aeration type of sewage treating apparatus, a sewage tank having a side wall and bottom wall, the side wall of said tank having a top portion over-hanging said tank, a support anchored in said over-hanging portion of said wall, an air pipe section pivotally mounted on said support for movement in a vertical plane generally normal to said wall, means for supplying said pipe section with compressed air, a second pipe section jointedly carried by the free end of said first pipe section and in communication therewith, said second pipe section being normally pivotally movable in a vertical plane generally parallel to the plane of movement of said first pipe section, an air diffuser assembly carried by the free end of said second pipe section, said assembly including at least one header and a plurality of diffuser elements extending from said header, said diffuser elements being supplied with air through said header and said pipe sections for diffusion into said liquid sewage, a stop carried by said assembly, said pipe sections being adapted to be raised and folded in jack-knife fashion for raising and lowering said diffuser assembly, said stop extending toward the nearest tank wall beyond any portion of the diffuser assembly in normal operating position, means on said tank bottom for supporting said pipe sections and said diffuser assembly in fixed position during normal diffusion operation, said supporting means including guide means for engaging a portion of said assembly when said assembly is lowered just before it reaches its final position, said assembly being so disposed that during the latter portion of said lowering said stop engages said tank wall to prevent engagement by said tank wall of said diffuser assembly but is moved by said guide means to clear said stop from said wall.

2. The apparatus of claim 1 wherein said guide means comprises a member having a V-shaped slot.

PHILIP F. MORGAN.

REFERENCES CITED

The following references are of record in the file of this patent:

UNITED STATES PATENTS

| Number | Name | Date |
|---|---|---|
| 2,144,385 | Nordell | Jan. 17, 1939 |
| 2,221,346 | Durdin, Jr. | Nov. 12, 1940 |
| 2,328,655 | Lannert | Sept. 7, 1943 |